United States Patent
Hemmings et al.

(10) Patent No.: US 7,811,377 B2
(45) Date of Patent: *Oct. 12, 2010

(54) LOW ALKALI, NON-CRYSTALLINE, VITREOUS SILICA FILLERS

(75) Inventors: Raymond T. Hemmings, Kennesaw, GA (US); Robert D. Nelson, Stone Mountain, GA (US); Philip L. Graves, Peoria, IL (US); Bruce J. Cornelius, Waterdown (CA)

(73) Assignee: Albacem LLC, Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/583,800

(22) Filed: Aug. 26, 2009

(65) Prior Publication Data

US 2009/0318279 A1    Dec. 24, 2009

Related U.S. Application Data

(60) Continuation of application No. 11/477,137, filed on Jun. 28, 2006, now Pat. No. 7,605,098, which is a continuation-in-part of application No. 10/873,470, filed on Jun. 21, 2004, now Pat. No. 7,070,131, which is a division of application No. 10/087,064, filed on Mar. 1, 2002, now Pat. No. 6,776,838.

(60) Provisional application No. 60/273,176, filed on Mar. 2, 2001.

(51) Int. Cl.
| | |
|---|---|
| C04B 14/04 | (2006.01) |
| C04B 14/38 | (2006.01) |
| C04B 14/00 | (2006.01) |
| C03C 8/00 | (2006.01) |
| C03C 8/02 | (2006.01) |
| C03C 13/00 | (2006.01) |
| C03C 13/06 | (2006.01) |
| C03C 3/091 | (2006.01) |
| C03C 3/087 | (2006.01) |
| C03C 14/00 | (2006.01) |
| C03C 14/02 | (2006.01) |

(52) U.S. Cl. .......... 106/484; 106/489; 106/711; 106/814; 501/14; 501/21; 501/35; 501/36; 501/66; 501/70; 65/21.1; 65/61; 65/442; 241/9

(58) Field of Classification Search .......... 501/14, 501/21, 36, 35, 66, 70; 106/716, 484, 489, 106/711, 814; 65/21.1, 61, 442; 241/9

See application file for complete search history.

(56) References Cited

U.S. PATENT DOCUMENTS 273,244 A    3/1883    Ardrey (Continued)

FOREIGN PATENT DOCUMENTS

DE    3440575    5/1986

(Continued)

OTHER PUBLICATIONS

Standard Specification for Glass Fiber Strands, ASTM Designation D578-00, May 2000, pp. 1-17, PA.

(Continued)

*Primary Examiner*—Anthony J Green
*Assistant Examiner*—Pegah Parvini
(74) *Attorney, Agent, or Firm*—Klauber & Jackson LLC

(57) ABSTRACT

A substantially white powder for use as a filler and/or extender derived from by-products of manufacturing vitreous low alkali, low iron glass fibers, and a method for producing the powder. The filler has very low alkalinity and by virtue of its being essentially free of crystalline silica is non-hazardous to health and therefore safe for consumer-based and industrial-based uses.

6 Claims, 1 Drawing Sheet

U.S. PATENT DOCUMENTS

| | | | |
|---|---|---|---|
| 273,245 A | 3/1883 | Bate |
| 688,550 A | 12/1901 | Schmidt |
| 3,971,754 A | 7/1976 | Jurecic |
| 4,016,131 A | 4/1977 | Shutt et al. |
| 4,438,212 A | 3/1984 | Potter et al. |
| 4,742,147 A | 5/1988 | Nichols |
| 5,088,927 A | 2/1992 | Lee |
| 5,736,158 A | 4/1998 | Quast |
| 6,029,477 A | 2/2000 | Hanvey, Jr. |
| 6,033,468 A | 3/2000 | Folks et al. |
| 6,199,778 B1 | 3/2001 | Hanvey, Jr. |
| 6,284,186 B1 | 9/2001 | Hansen |
| 6,296,699 B1 | 10/2001 | Jin |
| 6,344,081 B1 | 2/2002 | Pelot et al. |
| 6,776,838 B2 * | 8/2004 | Hemmings et al. | 106/716 |
| 6,881,764 B2 | 4/2005 | Doesburg et al. |
| 7,001,932 B2 | 2/2006 | Blackwell et al. |
| 7,087,103 B2 | 8/2006 | Suh et al. |
| 7,605,098 B2 * | 10/2009 | Hemmings et al. | 501/11 |
| 2002/0053304 A1 | 5/2002 | Pelot et al. |

FOREIGN PATENT DOCUMENTS

| | | |
|---|---|---|
| DE | 273244 A | 11/1989 |
| DE | 273245 A | 11/1989 |
| WO | WO 85/02394 | 6/1985 |
| WO | 00/44686 | 8/2000 |
| WO | 01/79132 | 10/2001 |

OTHER PUBLICATIONS

Xu, et al., Cement and Concrete Research, (1995) vol. 25, No. 6, pp. 1225-1236.

XP-002442609, abstract of SU1398604 (May 1988).

XP-002442610, abstract of JP53081526 (Jul. 1978).

\* cited by examiner ized composition of the amorphous glasses.

LOW ALKALI, NON-CRYSTALLINE, VITREOUS SILICA FILLERS

RELATED APPLICATIONS

This application is a continuation of U.S. Ser. No. 11/477,137 filed Jun. 28, 2006, which is now U.S. Pat. No. 7,605,098, which is a continuation-in-part of U.S. Ser. No. 10/873,470 filed Jun. 21, 2004, which is now U.S. Pat. No. 7,070,131, which is a divisional of U.S. Ser. No. 10/087,064 filed Mar. 1, 2002, now U.S. Pat. No. 6,776,838 which claimed priority from Provisional application No. 60/273,176 filed Mar. 2, 2001.

FIELD OF THE INVENTION

The present invention relates generally to fillers and extenders, and more specifically relates to a white filler and extender derived from glass manufacturing by-products, and to the method for producing the said product. The product is a non-crystalline, vitreous aluminosilicate of low alkali content and high brightness and finds application as a filler and extender in plastics, paints, coatings, and in other common uses for fillers and extenders.

BACKGROUND OF THE INVENTION

In a representative glass fiber manufacturing facility, typically 10-20 wt % of the processed glass material is not converted to final product and is rejected as industrial by-product or waste and sent for disposal to a landfill. This rejected material represents a substantial cost to the industry and also generates a consequent detrimental impact on the environment. While the rejected by-product referred to may have widely varying physical form, ranging from thick fiber bundles to partially fused fiber agglomerates and shot, it is evident from chemical analyses of various samples recovered at different times, that the material still has a substantially constant chemical and mineralogical make-up. Thus, unlike wastes from many other industrial processes which typically have widely varying chemical and mineralogical properties, the waste from the glass fiber manufacturing process is very consistent in composition and still benefits from the stringent engineering quality control applied to the glass-making process itself. This consistency is a major advantage to any potential utilization of the glass fiber manufacturing waste.

More specifically, the glass formulations of great relevance to this invention are those of low alkali calcia-alumina-silica compositions ($CaO$—$Al_2O_3$—$SiO_2$ or "CAS") typically used for commercial glass fiber manufactured to comply with ASTM D-578. These formulations are given in Table 1. The compositions are vitreous and by virtue of their components have very low levels of discolorants. These compositions are expressed conventionally in terms of the element oxide and are not meant to imply that the oxides, crystalline or otherwise, are present as distinct compounds in the amorphous glasses.

TABLE 1

| Component (Element Oxide) | Composition Range (% by Weight) |
| --- | --- |
| Silicon dioxide, $SiO_2$ | 52-62 |
| Aluminum oxide, $Al_2O_3$ | 12-16 |
| Iron oxide, $Fe_2O_3$ | 0.05-0.8 |
| Calcium oxide, CaO | 16-25 |
| Magnesium oxide, MgO | 0-5 |
| Sodium oxide + potassium oxide ($Na_2O + K_2O$) | 0-2 |
| Boron oxide, $B_2O_3$ | 0-10 |
| Titanium dioxide, $TiO_2$ | 0-1.5 |
| Fluorine, $F_2$ | 0-1 |
| Mineralogical Composition (XRD) | Amorphous (glassy) |

TABLE 1-continued

Several features are immediately evident from inspection of the data in Table 1. First, the general chemical and mineralogical composition of the glass fiber material is very similar to amorphous (glassy) calcium alumino-silicate materials, such as blast-furnace slag and Class C fly ash, that are commonly used as cementitious or pozzolanic admixtures in portland cement concrete; second, the alkali ($Na_2O+K_2O$) content of the glass is very low (0 to 2%); and third, with their inherently low iron contents (0.05 to 0.8%), the glasses have little or no color. Low alkali content and chemical consistency differentiates the glass fiber manufacturing waste from post consumer waste glass, for example container bottles and flat glass, that have widely varying chemical composition, generally high alkali content, and in the case of container/bottle glass are highly colored.

SUMMARY OF INVENTION

In the aforementioned parent patent applications the present inventors have found that once it is ground to a powder of suitable fineness, the glass fiber waste discussed above can effectively function as a reactive pozzolanic admixture for use in portland cement-based building materials and products, such as concrete, mortars and grouts. In another distinct aspect of the present invention, however, it has been found that these powder products can also serve as outstanding fillers and extenders in the manufacture of plastics, paints, coatings and in other conventional uses of fillers and extenders.

The finely ground glass powder of the invention (which retains the vitreous nature and chemical composition of the fiber feed) is white in color having a brightness as high as 90 or more (were measured as discussed below). The product is entirely vitreous, and thus contains essentially no crystalline silica. This is an exceedingly significant property, since it renders the silica based material safe for use in consumer and industrial applications in contrast with the health hazardous crystalline silica fillers of the prior art. These safe properties also assure that recycling of materials containing such filler/extenders will not be hampered by the presence of a hazardous filler. Furthermore the very low alkali content minimizes the accumulation of the alkali bloom phenomenon which is common with many prior art fillers. The products of the invention when used e.g. as fillers in polymers can be loaded in the polymer to typical levels of 20 to over 60% by weight. Depending upon loading and the specific polymer involved, desired mechanical, thermal and/or electrical properties of the filled polymer can be achieved. Because the fillers have low oil absorption, lower viscosities are present during manufacture, facilitating, processing of the filled polymer. Furthermore the low alkalinity of the fillers leads to greater stability in the filled materials.

According to a process aspect of this invention, glass fiber wastes are converted into high quality filler and extender products, by shredding long entangled strands of glass into short fibers, adjusting the moisture content of the short fibers, grinding the short fiber, and classifying the ground material to produce a uniform high quality product with precise control over the maximum particle size and particle size distribution. Because of its physical characteristics, this product will at times herein be referred to as "white VCAS filler/extenders", the "VCAS" being a reference to its production from fibers of "vitreous calcium-alumino-silicate" glass. The white VCAS filler/extender has a reflectance value of at least 80 as measured by a Technibrite TB-1C colorimeter according to the ISO 2467, 2471 method, and as already mentioned can have brightnesses of 90 or even higher.

DESCRIPTION OF PREFERRED EMBODIMENTS

Figure 1:
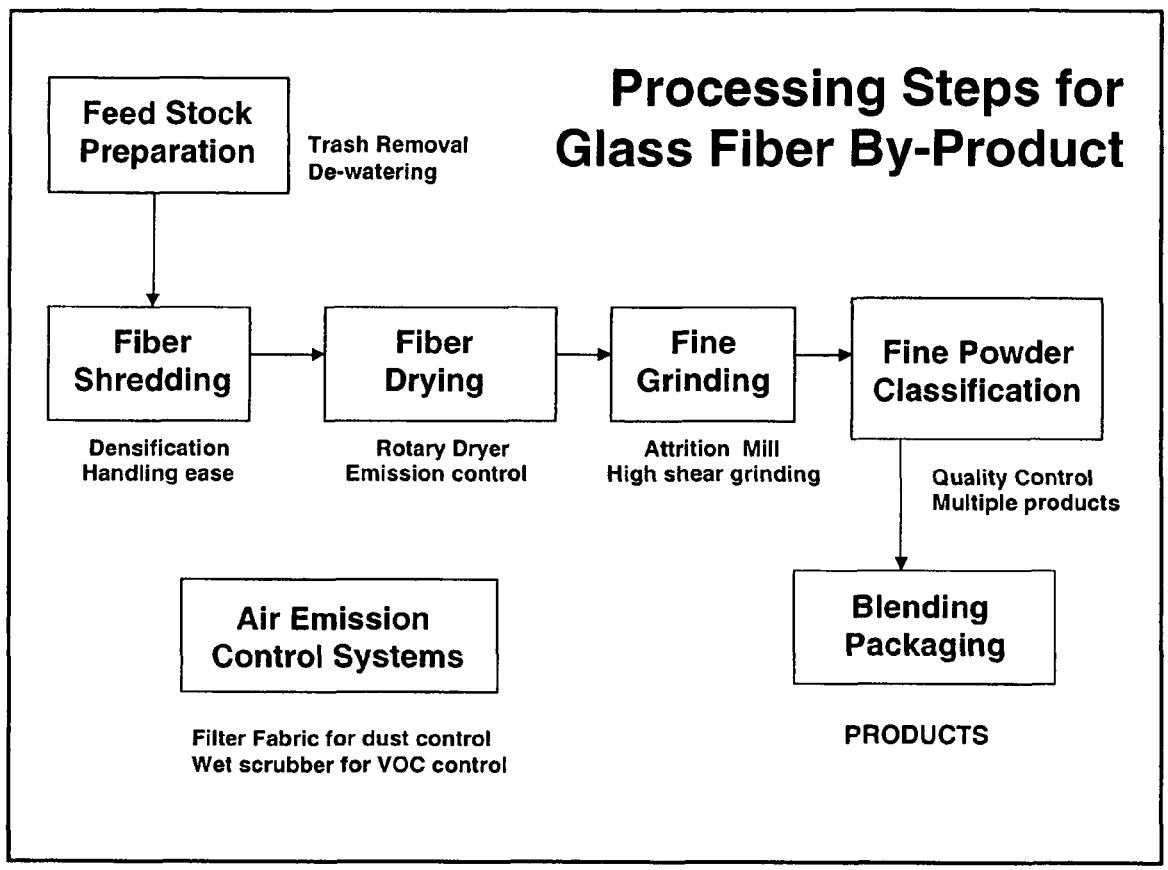
FIG. 1 is a schematic block diagram illustrating a process which may be used to prepare the fillers and extenders of the present invention.

According to the process aspect of this invention, glass fiber wastes are converted into high quality filler and extender products, by a shredding long entangled strands of glass into short fibers, adjusting the moisture content of the short fibers, grinding the short fiber, and classifying the ground material to produce a uniform high quality product with precise control over the maximum particle size and particle size distribution.

The process of glass manufacturing entails melting a mixture of carefully selected oxides, then cooling the molten material to produce the desired size, shape, and characteristics (e.g., container glass, flat glass, optical glass, fiber glass, etc.). The carefully selected ingredients for glass manufacturing are typically based on specific formulations of three material types: i.e., glass formers, glass modifiers or fluxes, and stabilizers. Glass formers comprise the major components of glass and most commonly consist of silicon dioxide in the form of sand and aluminum oxide in the form of alumina. Boron oxide is another common glass former component found in some formulations. Glass modifiers or fluxes lower the melting temperature and alter the viscosity of the glass melt and consist primarily of alkaline earth metal and alkali metal oxides, typically derived from the raw materials calcium carbonate, sodium carbonate and potassium carbonate. Stabilizers are added to make the glass strong and resistant to water and chemical attack. Low alkali glass, such as many of the formulations typically used for the manufacture of high performance glass fiber, is specially formulated for resistance to high temperatures and corrosive substances, in addition to having high physical strength and flexibility.

The process of glass fiber forming involves feeding molten glass from a high temperature furnace through a series of bushings containing thousands of accurately dimensioned holes or tips. Fine individual filaments of glass with diameters typically in the range 20-60 microns are drawn mechanically downward from the bushing tips, cooled and brought together to form bundles or strands of glass fibers. In the process of forming glass fibers, a significant amount of wastage is generated, mostly in the form of irregular, entangled long strands and bundles, often with nodules from partial fusion. The waste strands and bundles can be many tens of feet in length and are in a form that is not conducive to easy handling and processing by conventional means. This waste material is typically cooled by water and air quenching and shipped to a landfill for disposal. According to this invention a large amount of this waste glass fiber material can be processed and converted into high performance industrial products.

A typical process useful in the invention is shown schematically in FIG. 1. In the first step of the present process, the glass fiber waste (feed stock) is collected and placed in a containment area for de-watering and trash removal. Water used to cool the waste fiber stream is allowed to drain off the fibers and is collected and transferred to the wastewater treatment system. Incidental trash objects are manually removed from the bulk waste materials to allow for further processing.

In the second step of the process, the moist waste glass fiber bundles are processed by a shredder at fiber shredding through a shredder to reduce the fiber length from infinitely long entangled strands to short fibers (typically less than 10 mm) for subsequent processing. The shredding stage consists of processing the entangled strands through a rapid rotating mandrel with protruding cutting knives. Stationary cutting edges are also located opposite the rotating mandrel. The fast cutting action of the knives snaps the entangled glass bundles and strands into the desired short individual fibers. A screen enclosure around the rotating mandrel is used to retain the large entangled strands and ensure shredding into short fibers.

In the third step of the process (fiber drying), the moisture content of the shredded short fibers is adjusted prior to further processing using dry and heated air. The moisture content is controlled to a predetermined specific range to optimize the subsequent grinding process. Generally the moisture content should be less than 10% by weight, and is preferably less than 2% by weight. In a very typical instance the moisture content is from 0.5 to 1.0% by weight.

In the fourth step of the process, the shredded short fibers are subjected to fine grinding by being processed through an attrition mill, preferably in a vertical attrition mill such as a stirred or agitated ball mill. The short fibers and the ground glass are very abrasive materials. Abrasion of commonly used stirred mill components not only contaminates the product, it also reduces the grinding efficiency. In the present process the mill uses a rotation shaft and arms that agitate the grinding media and create both impact and shearing action, resulting in efficient product size reduction. The rotating arms are covered with replaceable leading-edge ceramic protectors composed of die cast and heat-fused alumina. The wall of the attrition mill is also lined with abrasion-resistant alumina to further minimize product contamination from the metal components in the mill. The mill uses the highest quality high alumina grinding media consisting of ⅛" to ⅜" diameter balls. The effectiveness and efficiency of the attrition mill are greatly enhanced by the die-cast, heat-fused leading edge protector attachments of the agitator arms. Energy inputs used in this grinding process are at least 100 kW-hrs/ton of feed fibers and typically are in the range of 100 to 200 kW-hrs/ton of the feed fibers.

The attrition mill is typically operated with continuous feed and discharge, although if desired it can alternatively be operated in a batch mode. The discharged grinding media and product are separated in stage five of this process using a vibratory screen with 80 to 100 mesh openings. The grinding media and oversize glass comminution products are returned to the attrition mill for continuous processing. The ground glass product passing the screen is conveyed to an air classification system for product refinement.

In step six of the invention (fine powder classification), the ground glass product is processed through a high-performance, dual-cyclone, dry air classification system. This stage is used to control the fineness and particle size distribution of the product from fine grind to low-micron range depending on the required specification. Particles larger than the maximum allowable are returned to the attrition mill for further grinding. The use of an air classification system in this stage allows for precise control over the maximum particle size and ensures the production of a uniform product. The air used in classification is vented through a filter fabric dust collector (Air emission control system). Ultra fine particles collected in the filter fabric can be blended with the final product (Blending Packaging).

The final classified white filler or extender product will generally have a particle size distribution such that at least 95% of the particles by weight have an equivalent spherical diameter (E.S.D.) of less than 45 μm (microns). Typically 95% by weight may be less than 25 μm; (typical median size around 9 μm); and for many applications the milling and classification will provide an end product where 95% by weight of the particles are of less than 10 μm E.S.D. (a typical median size here is around 3 μm); and in other instances the said end product can have P.S.D.'s where 95% of the particles by weight are less than 5 μm, or even less than 3 μm.

The finely ground white VCAS filler/extenders product as produced by this process is characteristically of a blocky, almost equi-dimensional particle shape, with no evidence of residual high aspect ratio fibers. The aspect ratio of the particles will typically average less than 2:1, with the aspect ratio becoming smaller as the average particle size becomes smaller as a result of the milling and classification as discussed above. The finely ground powder product yielded by the invention can be packaged in bags or sold in bulk for industrial filler and applications. This product can serve as a replacement to high priced white fillers and extenders. The final product from the process contains substantially no particles which NIOSH defines as "respirable fibers," i.e., particles which are greater than 5 μm in length and less than 3 μm in diameter with an aspect ratio of greater than or equal to 5:1.

The invention is further illustrated by the following Example, which is indeed to be considered exemplary of the invention, and not definitive thereof.

EXAMPLE 1

Preparation of VCAS Filler/Extenders

To facilitate an evaluation of their properties, by-product glass fiber waste materials having compositions as shown in Table 1 were ground to fine powders with a variety of different particle size distributions or finenesses. This was carried out using both laboratory and pilot-scale equipment in a multi-stage process involving drying, comminution, screening, and high efficiency air classification, the object being to have no residual high aspect ratio particles (shards) in the powder products. Representative sub-samples of the ground product materials from this process were characterized for their granulometry properties, some illustrative examples of which are shown in Table 2.

TABLE 2

| Pozzolan ID | SSA (m²/kg) | Median (μm) | D95 (μm) |
| --- | --- | --- | --- |
| GP1 | 269 | nd | 50 |
| GP2 | 560 | 12 | 30 |
| GP3 | 580 | 10 | 30 |
| GP4 | 686 | 9 | 25 |
| GP5 | 788 | 6 | 20 |
| GP6 | 956 | 3 | 10 |
| GP7 | >1200 | 1 | 3 |

The specific surface area (SSA) of the powders was determined by the Blaine air permeability method according to ASTM C-204. The results in Table 3 show that the range of specific surface areas for the prepared VCAS pozzolan powders was 250 to greater than 1200 m²/kg. The corresponding particle size distribution, median particle size, and D95 (particle size with 95% of the particles finer) of the products, were determined by the laser interferometer technique in aqueous dispersion using Microtrac® X100 or Coulter LS® particle size analyzers. The median particle sizes of the VCAS filler/extender products ranged from 1 μm (microns) to 12 μm, with corresponding D95 values ranging from 3 μm (microns) to 50 μm. The specific gravity of the VCAS filler/extender powders, as determined by the Le Chatelier method (ASTM C-188), was 2.57 cm²/g.

Examination of the VCAS filler/extender powders at high magnification by scanning electron microscopy (SEM) confirmed that, as is typical of such ground materials, all the VCAS pozzolan samples were substantially blocky in particle shape. There was no sign of residual high aspect ratio particles. X-ray powder diffraction (XRD) analysis of the powders confirmed that that they were all essentially amorphous in structure.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A filler or pozzolan product produced by a process comprising:
    (a) shredding long entangled strands of low alkali and low iron content vitreous glass fibers, said fibers having by weight an alkali content of less than 2%, and an iron content of less than 0.8% and having little or no color, the fibers being shredded into short fibers of less than 5 mm;
    (b) adjusting the moisture content of the short fibers;
    (c) grinding the short moisture adjusted fibers in an attrition mill; and
    (d) fine powder classifying the ground material through a high performance dual-cyclone, dry air classification system to produce a uniform white product having a reflectance value of at least 80 as measured by a Technibrite TB-1C colorimeter according to the ISO 2467, 2471 method, said classification being conducted with precise control over the maximum particle size and particle size distribution so that said product is characterized by a blocky, equi-dimensional particle shape wherein the average aspect ratio of the particles is less than 2:1, and with no residual high aspect ratio fibers, and a P.S.D. such that at least 95% by weight of the particles are of less than 45 microns E.S.D.

2. A filler or pozzolan product in accordance with claim 1, wherein said shredded and moisture adjusted short fibers are ground in a vertical attrition mill using an energy input of at least 100 kW/hrs/ton of said fibers.

3. A filler or pozzolan product in accordance with claim 1, wherein the moisture content of said shredded short fibers is adjusted to less than 10% by weight.

4. A filler or pozzolan product in accordance with claim 3, wherein the moisture content of said shredded short fibers is adjusted to less than 2% by weight.

5. A filler or pozzolan product in accordance with claim 3, wherein the moisture content of said shredded short fibers is adjusted to 0.5 to 1.0% by weight.

6. A filler or pozzolan product in accordance with claim 1, wherein said milling and classification is controlled so that the final product contains substantially no particles which are greater than 5 μm in length and less than 3 μm in diameter with an aspect ratio of greater than or equal to 5:1, whereby said product is substantially free of respirable particles.

* * * * *